(12) United States Patent
Lee et al.

(10) Patent No.: US 9,137,223 B2
(45) Date of Patent: Sep. 15, 2015

(54) APPARATUS AND METHOD FOR TRANSMITTING DATA, AND RECORDING MEDIUM STORING PROGRAM FOR EXECUTING METHOD OF THE SAME IN COMPUTER

(71) Applicant: SAMSUNG SDS CO., LTD., Seoul (KR)

(72) Inventors: Seon Young Lee, Seoul (KR); Hyo Jin Yoon, Seoul (KR); Jung Hoon Sohn, Seoul (KR); Kyung Seung Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 14/040,815

(22) Filed: Sep. 30, 2013

(65) Prior Publication Data

US 2014/0101444 A1  Apr. 10, 2014

(30) Foreign Application Priority Data

Oct. 9, 2012  (KR) ........................ 10-2012-0111577

(51) Int. Cl.
  *H04L 29/06*  (2006.01)
(52) U.S. Cl.
  CPC ............ *H04L 63/06* (2013.01); *H04L 63/0428* (2013.01); *H04L 63/062* (2013.01); *H04L 63/08* (2013.01)
(58) Field of Classification Search
  CPC ..... H04L 63/0428; H04L 63/06; H04L 63/08; H04L 63/062
  USPC .............................. 380/44, 279, 286; 713/168
  See application file for complete search history.

(56) References Cited

U.S. PATENT DOCUMENTS

| | | | | |
|---|---|---|---|---|
| 6,118,872 | A | * | 9/2000 | Kashima et al. ............... 380/205 |
| 2003/0221131 | A1 | * | 11/2003 | Mori et al. ..................... 713/202 |
| 2004/0228485 | A1 | | 11/2004 | Abu et al. |
| 2006/0161774 | A1 | * | 7/2006 | Huh et al. ....................... 713/168 |
| 2008/0063193 | A1 | * | 3/2008 | Nishioka ......................... 380/46 |

(Continued)

FOREIGN PATENT DOCUMENTS

| | | | |
|---|---|---|---|
| KR | 10-2005-0030982 A | 4/2005 |
| KR | 10-2007-0035342 A | 3/2007 |

(Continued)

OTHER PUBLICATIONS

International Search Report for PCT/KR2013/008621 dated Feb. 6, 2014 [PCT/ISA/210].

*Primary Examiner* — Chau Le
*Assistant Examiner* — Don Zhao
(74) *Attorney, Agent, or Firm* — Sughrue Mion, PLLC

(57) ABSTRACT

Disclosed are a data transmission/reception apparatus and method. A secret key generation unit uses a user ID as a public key to generate a secret key corresponding to the user ID. An encryption/decryption unit sets a user ID intended to receive data as an input value to encrypt the data using a certain method and decrypt the encrypted data using a certain method on the basis of a secret key corresponding to a user ID of a receiver generated by the secret key generation unit. The transmission apparatus and method according to the present invention allow for secure communication between terminals without server intervention by encrypting data using an ID-based encryption technique for safe data communication and then communicating the encrypted data.

16 Claims, 3 Drawing Sheets

(56) References Cited

U.S. PATENT DOCUMENTS

2008/0148047 A1* 6/2008 Appenzeller et al. ......... 713/162
2009/0034742 A1* 2/2009 Appenzeller et al. ......... 380/279
2012/0087494 A1* 4/2012 Spalka et al. .................. 380/46
2012/0204027 A1* 8/2012 Baek et al. ..................... 713/155
2012/0239942 A1* 9/2012 Yan .............................. 713/189

FOREIGN PATENT DOCUMENTS

| KR | 10-2009-0020869 A | 2/2009 |
| KR | 10-2009-0039451 A | 4/2009 |
| KR | 10-2012-0053929 A | 5/2012 |
| KR | 10-2012-0087644 A | 8/2012 |

* cited by examiner

APPARATUS AND METHOD FOR TRANSMITTING DATA, AND RECORDING MEDIUM STORING PROGRAM FOR EXECUTING METHOD OF THE SAME IN COMPUTER

CROSS-REFERENCE TO RELATED APPLICATION

This application claims priority to and the benefit of Republic of Korea Patent Application No. 10-2012-0111577, filed on Oct. 9, 2012, the disclosure of which is incorporated herein by reference in its entirety.

BACKGROUND

1. Field of the Invention

The present invention relates to an apparatus and method for transmitting data, and a recording medium storing a computer program for executing the method, and more particularly, to an apparatus and method for encrypting data on the basis of an identity-based encryption system and transmitting the encrypted data, and a recording medium storing a program for executing the method in a computer.

2. Discussion of Related Art

Recently, along with the widespread proliferation of personal smartphones, a message service between terminals is provided by using various forms, such as short message service, multimedia message service, a social network service (SNS), instant chatting service, and so on. As the message service is evolving into a social and business-oriented message service in which personal information should be sensitively handled, there is need for tighter security of data produced by users.

However, security in the current message system is mainly achieved through a network security technique such as a secure socket layer, which is vulnerable to interception of original data by an intermediate device other than a first transmitting terminal and a final receiving terminal, for example, a system server, during transmission and reception.

Secure Socket Layer (SSL), which is most widely used as a message service security technology, allows the data of the network to be encrypted and then moved using an authentication process between a client and a server. That is, in this technology, data is encrypted on the network and decrypted into the original data on the server. However, in most messaging services, a server in charge of SSL serves to store and deliver data to a final receiving terminal at an intermediate stage, not at a final receiving stage. This means that a third party, in addition to the first transmitter and the final receiver, can see the content of the original data, which may be problematic. For example, data transmitted from company A providing a corporate messaging service to company B using the service may be collected by the server. In general, security will be maintained between company A and company B on the basis of a contract. However, from a technical standpoint, the original data is accessible, which poses a potentially serious security problem. Therefore, with an identity-based encryption technique, a server authentication procedure such as SSL can be omitted depending on identity-based code properties, thereby preventing data from being leaked by a third party.

Looking over the related arts, Korean Patent Publication No. 2009-0020869, entitled "APPARATUS AND METHOD OF TRANSMITTING/RECEIVING ENCRYPTED DATA IN A COMMUNICATION SYSTEM" discloses that each of a plurality of mobile stations receives a public key from a server on the basis of its identity (ID) to generate a secret key, generates a token using the public key from other mobile stations, generates a session key using the public key and the token, and communicates encrypted data with other mobile stations through the generated session key.

Also, Korean Patent Publication No. 2005-0030982, entitled "METHOD AND SYSTEM FOR SAFELY DISTRIBUTING DIGITALCONTENTS THROUGH COMMUNICATION NETWORK BY USING USERPROGRAMS CONTAINING DIFFERENT DIGITAL IDENTIFICATIONS" discloses that a basic process for digital content seller authentication is implemented within an auxiliary device (for example, a semiconductor chip), and different types of authentication data are generated using a secret symmetric encryption algorithm and a secret key and then encrypted using a public key encryption algorithm and a private key. Thus, there is no need for a separate authentication center or clearing house, thereby simplifying the system and reducing operation cost.

SUMMARY OF THE INVENTION

The present invention is directed to an apparatus and method for transmitting data allowing secure communication between terminals without server intervention by encrypting data using an identity (ID)-based encryption technique for safe data communication and then communicating the encrypted data.

The present invention is also directed to a recording medium storing a computer program for executing a method for transmitting data allowing secure communication between terminals without server intervention by encrypting data using an identity (ID)-based encryption technique for safe data communication and then communicating the encrypted data.

According to an aspect of the present invention, there is provided a data transmission apparatus including: a secret key generation unit configured to generate a secret key corresponding to a user ID by using the user ID as a public key; and an encryption/decryption unit configured to encrypt the data by setting a receiving user ID intended to receive data as an input value and decrypt the encrypted data on the basis of the secret key corresponding to the receiving user ID generated by the secret key generation unit.

According to another aspect of the present invention, there is provided a data transmission method performed by a data transmission apparatus including: (a) generating a secret key corresponding to a user ID by using the user ID as a public key; (b) encrypting the data by setting a receiving user ID intended to receive data as an input value and decrypting the encrypted data on the basis of the generated secret key corresponding to the receiving user ID; and (c) transmitting the encrypted data to a second user terminal and receiving the encrypted data from the second user terminal.

According to the apparatus and method for transmitting data of the present invention, it is possible to securely communicate between terminals without server intervention by encrypting data using an ID-based encryption technique for safe data communication and then communicating the encrypted data. Also, there is no need to apply a separate network securing technique because data of a network is encrypted in advance. Thus, data may be safely encrypted and communicated between a plurality of terminals without a separate network securing technique. Furthermore, since the data is encrypted and moved to a final receiver having a secret key corresponding to an ID used as an input value, data security may be strongly maintained on the basis of safety guaranteed by the ID-based encryption technique. Also, the present invention can be implemented in a thin-client, and thus, in a low performance terminal, unlike a conventional ID-based encryption method.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, an apparatus and method for transmitting data according to an exemplary embodiment of the present invention will be described in detail with reference to the accompanying drawings.

Figure 1:
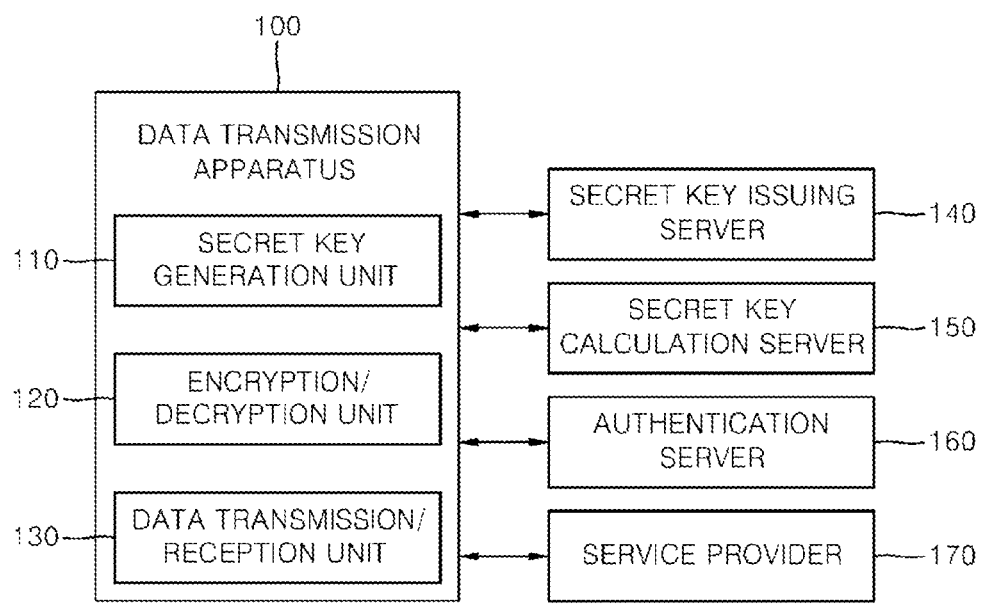
FIG. 1 is a block diagram of a configuration of a data transmission apparatus according to an embodiment of the present invention, showing an overall system where a data transmission method is implemented according to the present invention.
Figure 2:
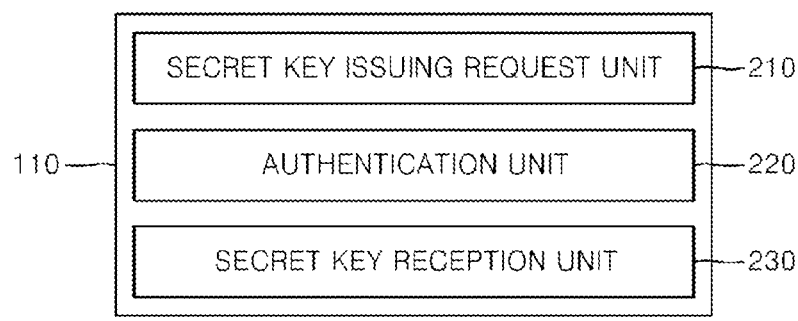
FIG. 2 is a block diagram showing a configuration of a secret key generation unit according to the present invention.

FIG. 1 is a block diagram of a configuration of a data transmission apparatus 100 according to an embodiment of the present invention, showing an overall system where a data transmission method is implemented according to the present invention, and FIG. 2 is a block diagram showing a configuration of a secret key generation unit 110 according to an embodiment of the present invention.

Referring to FIG. 1, the data transmission apparatus 100 according to an embodiment of the present invention includes a secret key generation unit 110, an encryption/decryption unit 120, and a data communication unit 130. Also, in order to perform the data transmission method, the data transmission apparatus 100 may further include a secret key issuing server 140, a secret key calculation server 150, an authentication server 160, and a service provider 170.

The secret key generation unit 110 generates a secret key corresponding to a user ID, using the user ID as a public key. Referring to FIG. 2, the secret key generation unit 110 includes a secret key issuing request unit 210, an authentication unit 220, and a secret key reception unit 230. The authentication unit 220 transmits a user ID to the secret key issuing server 140 and requests authentication of the user ID in order to receive the secret key corresponding to the user ID by using the user ID as the public key.

In this case, the secret key issuing server 140 transmits authentication data to the authentication server 160 in order to authenticate whether the received ID is of an authorized user. Simultaneously, the secret key issuing server 140 may input a first value obtained by applying a certain hash function to the user ID to the secret key calculation server 150 and request the secret key calculation server 150 to issue the secret key. The reason why the secret key issuing server 140 requests the secret key calculation server 150 to issue the secret key before the process of authentication to determine whether the received ID is of an authorized user is completed is to reduce a secret key issuing time experienced by a user, because it takes a certain amount of time to calculate the secret key using the ID-based encryption technique. Accordingly, the secret key issuing server 140 may transmit the authentication data to the authentication server 160 and simultaneously request the secret key calculation server 150 to issue the secret key. Alternatively, the secret key issuing server 140 may request the secret key calculation server 150 to issue the secret key after the secret key issuing server 140 is requested by the secret key issuing request unit 210 of the data transmission apparatus 100 to issue the secret key.

After transmitting the authentication data to the authentication server 160, the secret key issuing server 140 notifies the authentication unit 220 of the authentication data transmission completion. In this case, the secret key issuing server 140 may inform the authentication unit 220 about a time and address where the secret key issuing server 140 has transmitted the authentication data to the authentication server 160, and then the authentication unit 220 may receive the information and obtain the authentication data from the authentication server 160 on the basis of the information.

The secret key issuing request unit 210 may request the secret key issuing server 140 to issue the secret key when authentication of the user ID by the authentication unit is completed 220 through the above procedure. In this case, the secret key issuing request unit 210 transmits, to the secret key issuing server 140, the authentication data obtained from the authentication server 160 and a second value obtained by applying a certain hash function to the user ID.

Accordingly, the secret key issuing server 140 receives the authentication data and the second value from the secret key issuing request unit 210, checks whether the first value and the second value, each of which is calculated by applying a certain hash function to a user ID, are the same as each other, and verifies the authentication data to check whether the user is an authorized user entitled to receive the secret key. In this case, after receiving the secret key issuing request from the secret key issuing server 140, the secret key calculation server 150 issues the secret key corresponding to the user ID and transmits the issued secret key to the secret key issuing server 140, and the secret key issuing server 140 receives the secret key and then contains the secret key during the user authentication. Accordingly, when the user authentication is completed, the secret key issuing server 140 transmits, to the secret key reception unit 230, the secret key received and contained from the secret key calculation server 150.

In this way, each user terminal may receive in advance its user ID and a secret key corresponding to the user ID.

Figure 4:
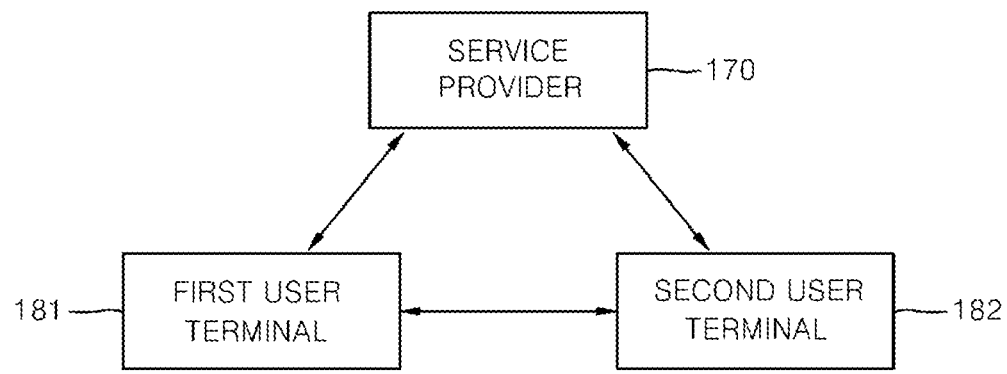
FIG. 4 shows an application environment where the data transmission method according to the present invention is applied.

Accordingly, the encryption/decryption unit 120 sets a user ID intended to receive data as an input value to encrypt the data using a certain method and decrypt the encrypted data using a certain method on the basis of a secret key corresponding to a user ID of a receiver generated by the secret key generation unit 110. Here, the encryption and decryption method may be a typical, widely known method. The data communication unit 130 may transmit or receive the data encrypted by the encryption/decryption unit 120 to or from the receiver user terminal. That is, as shown in FIG. 4, a first user terminal 181 and a second user terminal 182, each of which has the data transmission apparatus 100 operating, may communicate the encrypted data with each other.

That is, a user may encrypt data using the ID-based encryption technique through the above procedure and communicate the encrypted data, thereby maintaining the security of the data.

Here, the secret key calculation server 150 issues the secret key used in the present invention as described above, and receives a secret key issuing request from the secret key issuing server 140 to calculate the secret key.

The secret key calculation server 150 and the secret key issuing server 140 may be the same server or different servers. If they are the same server, there is no problem with respect to information exchange or security between two servers. If they are different servers, the servers may be operated by different providers and thus more care is needed. Also, the service provider 170 for providing a detailed service (for example, text message service or chatting program) to a user terminal may also be the same server as the secret key issuing server 140. Accordingly, the secret key issuing server 140 including the service provider 170 may be replaced with a variety of service providers which contain and manage service users. However, the secret key calculation server 150 should be designed to have no dependence on external services because the secret key calculation server 150 is a kind of general-purpose calculator for calculating a discrete log problem.

Accordingly, in the present invention, only the secret key issuing server is in charge of authentication procedure for the authorized user, and the secret key calculation server 150 serves only to issue the secret key. To this end, the secret key calculation server 150 and the secret key issuing server 140 are separated using a local Internet that is inaccessible from the outside, and connected to a closed network. Then, the secret key issuing server 140 may set, as an input value, a value obtained by applying a certain hash function to an ID for which user authentication is completed and request the secret key from the secret key calculation server 150.

Thus, the secret key calculation server 150 issues the secret key but does not know whose secret key it is, thereby preventing user information managed by the secret key issuing server 140 from being inadvertently delivered to the outside. Also, it is possible to prevent an attempt by a malicious third party to use any ID illegally to issue the secret key. Alternatively, as mean appropriate for the above purpose, another safe network securing technique may be used instead of the closed network.

The reason why the authentication server 160 is positioned separately from the secret key issuing server 140 is to authenticate whether the user ID received from the data transmission apparatus 100 is of an authorized user. The best feature of the ID-based encryption technique is that a user can use an ID indicated by the user as a public key, which necessitates a process of checking whether a user requesting the ID is an authorized user. For example, if the ID is an email address, the secret key issuing server 140 may send an authentication email to the email address to allow a user of the ID to pass the authentication process only when the email is accessible. Alternatively, if the ID is a cell phone number, the secret key issuing server 140 may authenticate a user using a method of sending an authentication text message. A user ID is not limited to an email address or cell phone number, and any information for personal identification may be used as the user ID.

That is, an authentication process of checking whether a user is authorized may proceed by sending the authentication data to an area accessible only by ID information. As such, the authentication server 160 for authenticating a user using a channel separately from the secret key issuing server 140 may be an email server or communication service company's server.

Also, the service provider 170 provides a detailed service such as a text message service or chatting program. As described above, the service provider 170 may be included in the secret key issuing server 140 and operated as one server. A user using the text message service provided by the service provider 170 may generate the secret key corresponding to the user ID on the basis of a discrete logarithm calculation method using a pre-computation table executed by the data transmission apparatus 100 on the user terminal used by the user, encrypt a message to be transmitted to another person with the secret key, and transmit the encrypted message to the other person.

Figure 3:
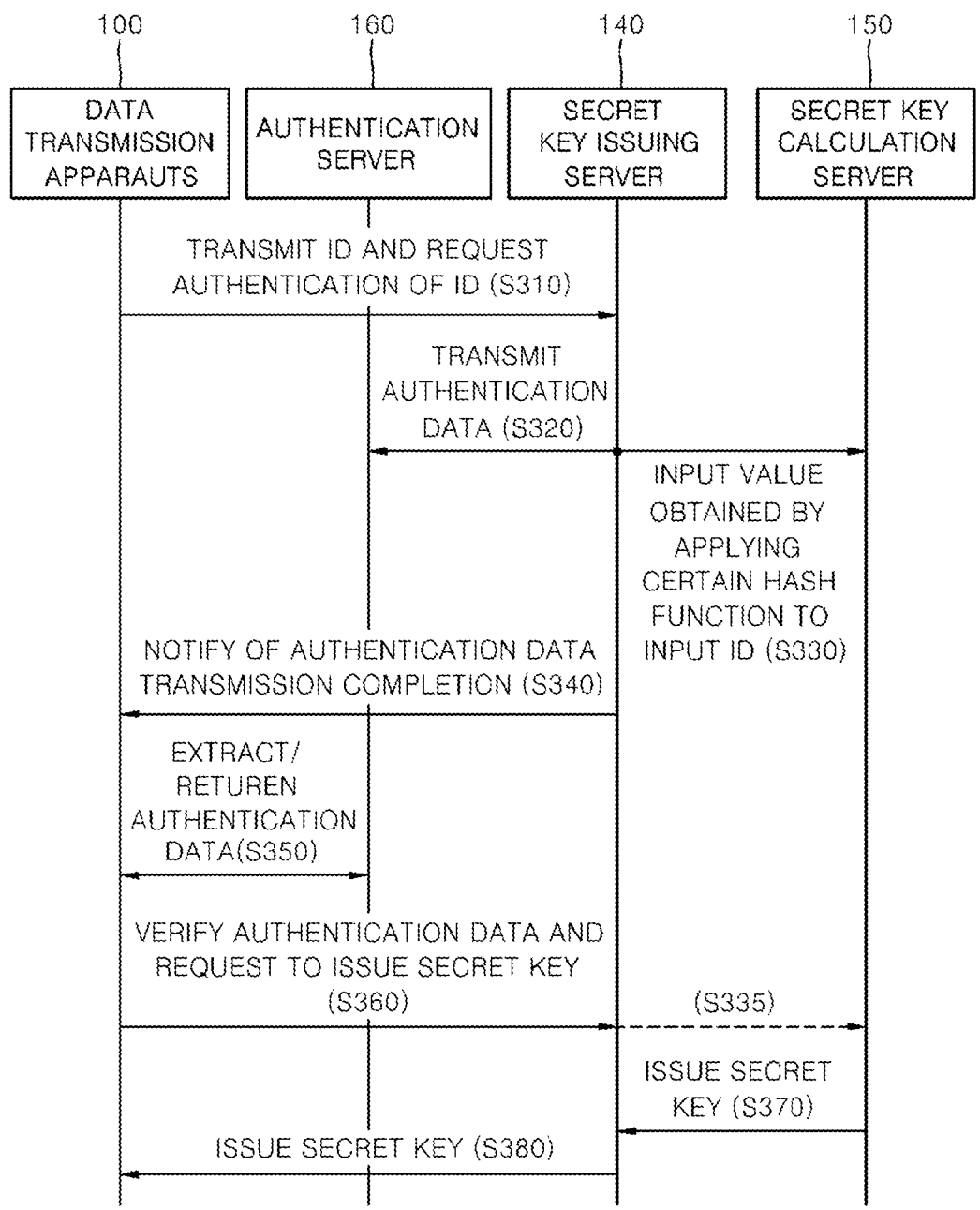
FIG. 3 is a flowchart of a data transmission method according to the present invention.

FIG. 3 is a flowchart of a previous secret key issuing method for a data transmission method according to the present invention. Referring to FIG. 3, it can be seen which steps are performed in the method of transmitting data from the data transmission apparatus 100 to the secret key calculation server 150. In this case, it can be assumed that a communication process for each step is safely performed using a network securing technique such as Secure Socket Layer (SSL). This is a preparation step for using the data transmission method according to the present invention, where the network securing technique is applied to only the process of receiving the secret key. That is, the network securing technique such as SSL is used before issuing the secret key, and data is encrypted and communicated after issuing the secret key.

The secret key request method in the data transmission method according to the present invention is largely divided into two steps. The first step is a step of requesting authentication of a user ID (S310), and the second step is a step of sending a value obtained by applying the user ID to a certain hash function, in addition to authentication data, and requesting a secret key (S360). The reason why the method is divided into two steps is to prevent a malicious third party from spying on the secret key issuing process and finding out the secret key.

If actual ID and authentication data instead of a value obtained by applying a certain hash function to the user ID are transmitted to the secret key issuing server 140 in the second step (S360), and the secret key is issued in response thereto, the malicious third party may intercept the request and response to find out an ID and secret key pair. However, by sending the value obtained by applying a certain hash function to the user ID in the second step (S360), the malicious third party cannot find out the ID related to the secret key even through spying.

The certain hash function is commonly defined for the secret key issuing server 140 and the data transmission apparatus 100. Thus, the secret key issuing server 140 calculates a value by applying a hash function to an ID received in the first step (S310), and if the value is the same as a value obtained by applying the hash function received in the second step (S360), confirms that the requests in the two steps (S310 and S360) are made by the same user and also verifies the authentication data, thus finally determining whether the user is allowed to receive the secret key. Also, in the above processes, the communication is performed using a network securing technique such as Secure Socket Layer (SSL), and thus the data is encrypted and the information cannot be easily leaked even through spying.

Referring to FIG. 3, first, the data transmission apparatus 100 transmits an ID to the secret key issuing server 140 and requests the secret key issuing server 140 to authenticate the ID (S310). For example, the data transmission apparatus 100 may transmit a message requesting an email address as an ID, using a URL address "http://서버주소/idbc?userID=idbc.user01@gmail.com". When receiving the request of operation S310, the secret key issuing server 140 may send authentication data to the authentication server 160 in order to authenticate whether the ID is of an authorized user (S320) and simultaneously set, as an input value, a first value obtained by applying a certain hash function to the ID to send a secret key request to the secret key calculation server 150 (S330). The reason why the secret key issuing server 140 requests to issue the secret key before the authentication process of checking whether the received ID is of an authorized user is completed is to reduce a secret key issuing time. In this case, the secret key is generated during user authentication and then stored in the secret key issuing server 140. If the user authentication is successfully completed, the secret key is safely delivered to the data transmission apparatus 100. If the user authentication fails, the issued secret key may be discarded.

When receiving the request of operation S310, the secret key issuing server 140 may receive a secret key issuing request from the data transmission apparatus 100 (S360) and then set, as an input value, a first value obtained by applying a certain hash function to the ID to send the secret key request to the secret key calculation server 150 (S335). Alternatively, the secret key issuing server 140 may set, as an input value, a first value obtained by applying a certain hash function to the ID to request the secret key calculation server 150 to issue the secret key, between operation S330 and operation S335.

The authentication data sent from the secret key issuing server 140 to the authentication server 160 may be used to transmit an email including an authentication code to an email address extracted from the URL address of the example. In this case, the authentication server 160 is a server for providing an email service, and only a user capable of logging into the address can find out the authentication data. Accordingly, the secret key issuing server 140 may inform the data transmission apparatus 100 about the time and address where the secret key issuing server 140 has transmitted the authentication data to the authentication server 160, in response to the first request (S310) (S340), and then the data transmission apparatus 100 may access the authentication server 160 in order to extract authentication data from the authentication server 160 using the response data, to receive the authentication data (S350).

When obtaining the authentication data in this way, the data transmission apparatus 100 may verify that it is an authorized user through the second request and simultaneously request to issue the secret key (S360). In this case, data to be transmitted for the secret key request in addition to the authentication data is a second value obtained by applying a certain hash function to the user ID.

When receiving the second request (S360) from the data transmission apparatus 100, the secret key issuing server 140 verifies the authentication data and simultaneously check whether the first value obtained by applying a certain hash function to the ID of the first request (S310) is the same as the data (that is, the second value) of the second request (S360). If they are the same, the secret key issuing server 140 transmits the secret key received from the secret key calculation server 150 (S370) to the data transmission apparatus 100 (S380), and deletes all information temporarily stored for the issuing of the secret key in the secret key issuing server 140.

Finally, when receiving the secret key, a client terminal having the data transmission apparatus 100 operating should encrypt and store the secret key in a local disk in order to safely use the secret key. If the client terminal is a smartphone, the client terminal may encrypt the secret key using an encryption technology such as Advanced Encryption Standard (AES) and store the encrypted secret key in an SD card, an embedded memory, or a USIM card depending on the use. In this case, an encryption technology such as Advanced Encryption Standard (AES) requires a password, which may be specified by the user or grouped together with an ID used by the user for a message service. If a login process is needed to use the message service, an ID and password are information that are necessarily input when logged in. Accordingly, if the secret key encrypted with Advanced Encryption Standard (AES), which has been stored in a local disk, may be decrypted using the information and loaded to a memory during the login process, the secret key may be quickly loaded from the memory and used instead of loading the secret key whenever the message is encrypted or decrypted.

Accordingly, if the secret key is prepared in a client terminal where the data transmission apparatus 100 operates, there is no need for the secret key calculation server 150 and the authentication server 160. That is, a task of encrypting or decrypting data with only the ID and secret key in the client terminal is performed, and thus no apparatus for safe data communication is needed other than the secret key issuing server 140 for using the data transmission apparatus 100. However, an operation of issuing the secret key may be repeated to update the secret key periodically or reissue the secret key in an emergency depending on the characteristics of the ID-based encryption technique.

The method of encrypting data using the ID-based encryption technique is based on a general ID-based encryption technique. For example, if a message is encrypted using an ID of a final receiver as an input value, the encrypted data may only be decrypted by the final receiver having the secret key. Accordingly, whoever may encrypt and send data, if he/she knows the ID of the final receiver, the encrypted data may be secured according to the safety guaranteed by the ID-based encryption technique, even when the encrypted data is leaked by a malicious third party and even though a separate network transmission technique is not used during the transmission process.

It is assumed that there is a mobile chatting program that completes a secret key issuing procedure applying the data transmission method according to the present invention, for example, using an email ID, and has the email ID as an ID. "Sun-young" has a friend list and may select "Hyo-jin" from the friend list and then start chatting. In this case, an email address of "Hyo-jin" may be set as an input value, "Hello" input by "Sun-young" may be encrypted into a value of "2AFC612BE9263" in the mobile device and then the encrypted data may be delivered to "Hyo-jin" over a communication network. If "Hyo-jin" has already issued the secret key, she may set her secret key as the input value to decrypt a message, and a message "Hello" sent by "Sun-young" may be normally displayed on a mobile terminal screen of "Hyo-jin".

Figure 5:
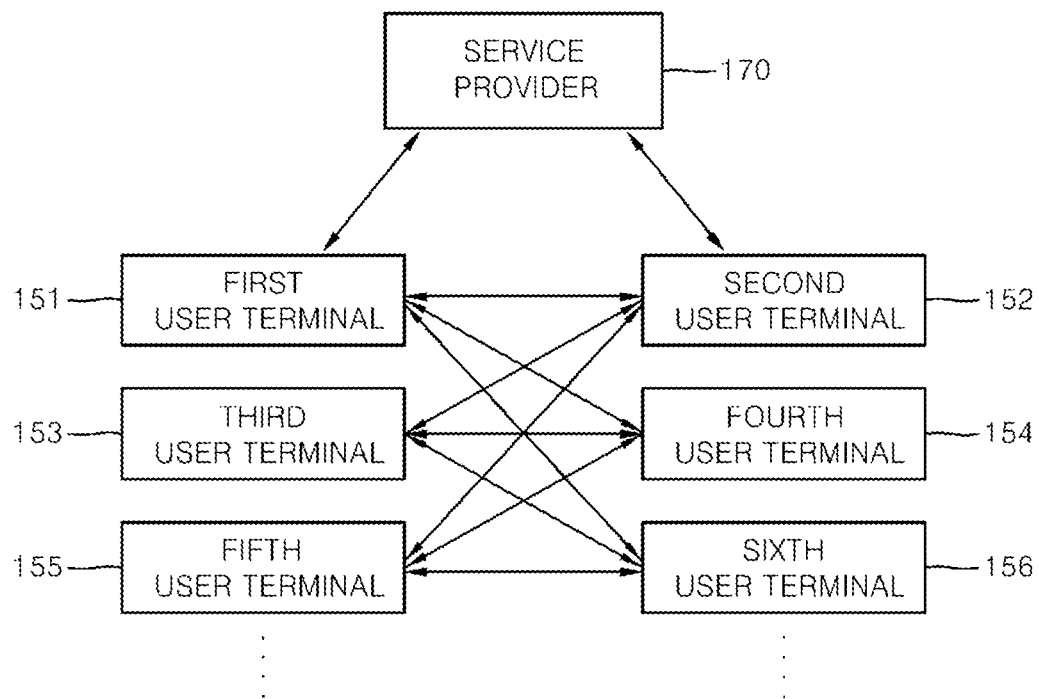
FIG. 5 shows an application environment where the data transmission method according to the present invention is applied in a multiple terminal environment.

However, if "Hyo-jin" does not yet have the secret key, the message "Hello" sent by "Sun-young" may be encrypted such as "2AFC612BE9263" and displayed. This means that data of "Hello", which is an original message, is encrypted and delivered from the mobile device of "Sun-young", and that no one can decrypt the data other than an authorized user having the secret key. This indicates that the data may exist on the network safely without a separate network securing technique, which may be actually called end-to-end secure communication. That is, as shown in FIG. 5, data may be safely encrypted and communicated between a plurality of terminals without a separate network securing technique. As shown in FIG. 5, a method of encrypting data multiple times for each ID of a receiving terminal and transmitting the encrypted data may be applied between the plurality of terminals. Alternatively, a group ID may be used.

Returning FIG. 3, in the step of requesting authentication of a user ID (S310), the "user ID" is regarded as the "group ID". In this case, encrypted communication between a plurality of terminals having the same group ID and secret key is allowed by issuing the secret key for the group ID using means accessible by only a specific group. Alternatively, the plurality of terminals may each have their own ID and generate the same session key using their information. Thus, a method of further applying a symmetry key-based algorithm may be allowed.

It will be understood that, although the terms first, second, A, B, etc. may be used in the above description in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

The invention can also be embodied as computer-readable codes on a computer-readable recording medium. The computer-readable recording medium is any data storage device that can store data which can be thereafter read by a computer system. Examples of the computer-readable recording medium include a ROM, a RAM, a CD-ROM, a magnetic tape, a floppy disk, and an optical data storage. Further, the recording medium may be implemented in the form of carrier waves such as are used in Internet transmission. The computer-readable recording medium can also be distributed over computer systems connected through a wired/wireless communication network so that the computer-readable code is stored and executed in a distributed fashion. A computer system, such as the one mentioned above, is very familiar to those who practice in these technical arts. Therefore, the discussion herein has avoided obscuring the key features of the exemplary embodiments by purposefully omitting details concerning the manner in which a hardware processor of such a computer system uses the above-identified computer-readable codes and data storage device to carry out the various functions or implement the various units previously mentioned. Likewise, since a person familiar with this field understands that such functions and units may be implemented through various combinations of hardware and/or software, such implementation details are likewise omitted.

While the present invention has been particularly shown and described with reference to preferred embodiments thereof, it should not be construed as being limited to the embodiments set forth herein. It will be understood by those skilled in the art that various changes in form and details may be made to the described embodiments without departing from the spirit and scope of the present invention as defined by the following claims.

What is claimed is:

1. A data transmission apparatus, comprising:
a secret key generator configured to obtain a secret key corresponding to a user owned ID from a secret key generation server;
an encryptor/decryptor configured to:
encrypt original data by carrying out an encryption operation using a received user ID as an input value for producing encrypted data for transmission, and
decrypt received encrypted data by carrying out a decryption operation using the secret key obtained by the secret key generator for obtaining decrypted received data;
a data transmitter/receiver configured to transmit the encrypted data for transmission to a received user terminal and to receive the encrypted data; and
a hardware processor implementing at least one of the secret key generator and the encryptor/decryptor,
wherein the secret key generation server requests to issue the secret key before an authentication regarding the user owned ID is completed.

2. The data transmission apparatus of claim 1, wherein the secret key generator comprises:
an authenticator configured to transmit, to a secret key issuing server, the user owned ID; request authentication, by the secret key issuing server, of the user owned ID; receive an authentication data transmission completion notification as an indication that authentication data of the user owned ID has been transmitted to an authentication server; and receive the authentication data;
a secret key issuing requester configured to request the secret key issuing server to issue the secret key when authentication of the user owned ID by the authenticator is completed; and
a secret key receiver configured to receive the secret key from the secret key issuing server.

3. The data transmission apparatus of claim 2, wherein the authenticator obtains the authentication data from the authentication server on the basis of a time and address of transmission of the authentication data by the secret key issuing server to the authentication server.

4. The data transmission apparatus of claim 2, wherein, when receiving the user owned ID from the authentication unit and receiving an authentication request for the user owned ID, the secret key issuing server transmits the authentication data to the authentication server and sets a first value obtained by applying a certain hash function to the user owned ID as an input value to request the secret key calculation server to issue the secret key.

5. The data transmission apparatus of claim 2, wherein, when receiving the secret key issuing request from the secret key issuing requester, the secret key issuing server sets a first value obtained by applying a certain hash function to the user owned ID as an input value to request the secret key calculation server to issue the secret key.

6. The data transmission apparatus of claim 4, wherein the secret key issuing request unit transmits the authentication data obtained from the authentication server and a second value obtained by applying a certain hash function to the user owned ID, to the secret key issuing server.

7. The data transmission apparatus of claim 6, wherein the secret key issuing server checks whether the first value and the second value are the same, and verifies the authentication data to determine whether a user is an authorized user entitled to receive the secret key.

8. The data transmission apparatus of claim 2, wherein the secret key is generated on the basis of a discrete logarithm calculation method using a pre-computation table.

9. A data transmission method performed by a data transmission apparatus, the data transmission method comprising:
(a) determining whether data to be transmitted exists; and
(b) in response to the data exists, performing a data receiving process;
wherein the data receiving process comprises:
(c1) obtaining a secret key corresponding to a user owned ID; and (c2) decrypting received encrypted data by carrying out a decryption operation using the secret key for obtaining decrypted received data;

wherein the data transmitting process comprises:

(d1) encrypting original data by carrying out an encryption operation using a received user ID as an input value for producing encrypted data for transmission; and (d2) transmitting the encrypted data for transmission;

wherein at least one of the data receiving process and the data transmitting process is carried out by a hardware processor, and wherein the obtaining the secret key comprises requesting to issue the secret key before an authentication regarding the user owned ID is completed.

10. The data transmission method of claim 9, wherein (c1) comprises:

(c11) transmitting the user owned ID to a secret key issuing server, in order to obtain the secret key and simultaneously requesting authentication of the user owned ID;

(c12) requesting the secret key issuing server to issue the secret key when the authentication of the user owned ID is completed; and (c13) receiving the secret key from the secret key issuing server.

11. The data transmission method of claim 10, wherein, when receiving the user owned ID and receiving an authentication request for the user owned ID, the secret key issuing server transmits the authentication data for the user owned ID to an authentication server and sets a first value obtained by applying a certain hash function to the user owned ID as an input value to request the secret key calculation server to issue the secret key.

12. The data transmission method of claim 10, wherein, when receiving the secret key issuing request corresponding to the user owned ID, the secret key issuing server sets the first value obtained by applying a certain hash function to the user owned ID as an input value to request the secret key calculation server to issue the secret key.

13. The data transmission method of claim 10, wherein (c12) comprises transmitting the authentication data extracted from an authentication server and a second value obtained by applying a certain hash function to the user owned ID, to the secret key issuing server.

14. The data transmission method of claim 13, wherein the secret key issuing server checks whether the first value and the second value are the same, and verifies the authentication data to determine whether a user is an authorized user entitled to receive the secret key.

15. The data transmission method of claim 10, wherein the secret key is generated on the basis of a discrete logarithm calculation method using a pre-computation table.

16. A non-transitory computer-readable media having recorded thereon a program for enabling a computer with a hardware processor to implement a data transmission method of:

(a) determining whether data to be transmitted exists; and (b) in response to the data exists, performing a data receiving process;

wherein the data receiving process comprises:

(c1) obtaining a secret key corresponding to a user owned ID; and (c2) decrypting received encrypted data by carrying out a decryption operation using the secret key for obtaining decrypted received data;

wherein the data transmitting process comprises:

(d1) encrypting original data by carrying out an encryption operation using a received user ID as an input value for producing encrypted data for transmission; and (d2) transmitting the encrypted data for transmission, wherein the obtaining the secret key comprises requesting to issue the secret key before an authentication regarding the user owned ID is completed.

* * * * *